(12) United States Patent
Li

(10) Patent No.: US 11,803,064 B1
(45) Date of Patent: Oct. 31, 2023

(54) AI HEADSET COMPUTER WITH A FREELY ADJUSTABLE CANTILEVER

(71) Applicant: RealWear (Shanghai) Intelligent Technology Co., Ltd, Shanghai (CN)

(72) Inventor: Bo Li, Shanghai (CN)

(*) Notice: Subject to any disclaimer, the term of this patent is extended or adjusted under 35 U.S.C. 154(b) by 0 days.

(21) Appl. No.: 17/866,401

(22) Filed: Jul. 15, 2022

(51) Int. Cl.
    *G02B 27/01* (2006.01)
    *G02B 27/00* (2006.01)
    *G06V 40/16* (2022.01)

(52) U.S. Cl.
    CPC ..... *G02B 27/0176* (2013.01); *G02B 27/0093* (2013.01); *G02B 27/0101* (2013.01); *G02B 27/017* (2013.01); *G06V 40/161* (2022.01); *G02B 2027/014* (2013.01); *G02B 2027/0138* (2013.01)

(58) Field of Classification Search
    CPC .............. G02B 27/017; G02B 27/0176; G02B 27/0172; G02B 27/0093; G02B 2027/0138; G02B 2027/014; G06V 40/161
    See application file for complete search history.

(56) References Cited

U.S. PATENT DOCUMENTS

| | | | | |
|---|---|---|---|---|
| 2020/0371357 | A1* | 11/2020 | Choi | G02B 27/0176 |
| 2021/0255481 | A1* | 8/2021 | Ryner | G02C 5/2227 |
| 2022/0232148 | A1* | 7/2022 | Song | H04N 23/55 |

* cited by examiner

*Primary Examiner* — Yuzhen Shen

(57) ABSTRACT

The invention relates to the technical field of head-mounted devices, in particular provides an AI headset computer with a freely adjustable cantilever, comprising a head-mounted device and a computer main body connected to the head-mounted device; the computer main body is connected to the head-mounted device by an extendable arm; the computer main body is communicatively connected to at least one set of camera units and indicator lights; the camera units are embedded on at least two opposite sides of the opaque display modules of the computer main body; the indicator lights are provided for pointing in the same direction of the captured viewpoints of at least one set of camera units; the camera units are provided to transmit the captured viewpoint position data to the computer main body; and the equivalent video generated after processing is projected on the realistic screen of the opaque display module.

7 Claims, 8 Drawing Sheets

AI HEADSET COMPUTER WITH A FREELY ADJUSTABLE CANTILEVER

1. TECHNICAL FIELD

The invention relates to the technical field of head-mounted devices, in particular provides an AI headset computer with a freely adjustable cantilever.

2. BACKGROUND ART

Headset AI computers are increasingly being adopted in the fields of industry. The Headset AI computers having the following characteristics: the head-mounted device enabling the hands-free experience, performing significant tasks such as remote technical guidance, electronic workflows, data visualization and electronic drawings. The device adopts the head-mounted construction design and AI-controlled features enable the significant enhancement of the efficiency of the on-site work and great improvement of the construction safety.

The headset computer is a kind of tiny, compact and portable micro-computer adopting a micro-display located in front of the human eye as a monitor that can be worn on the head like glasses, allowing the users to obtain information while being able to use both hands for other operations without restriction. The earphones of the headset computer are convenient for staff to use while listening to the computer's instructions for operation.

However, in the prior arts, the display, camera and laser indicators of the head-mounted device are fixed. As a result, the wearer cannot be adjusted by twisting left and right as well as up and down during machine inspection, especially the limited number of cameras and laser indicators resulting in the requirements for the wearer to observe the target through their own eyes. Moreover, the combination of the eye observation with the display screen could make a comprehensive judgment, leads to the inconvenience of the field operation. In order to solve the technical problems, an AI headset computer with a freely adjustable cantilever is now disclosed.

3. SUMMARY OF THE INVENTION

To solve the above technical problems, the invention provides the technical solution:

An AI headset computer with a freely adjustable cantilever, wherein comprises a head-mounted device and a computer main body connected to the head-mounted device.

The computer main body is connected to the head-mounted device by an extendable arm; the extendable arm comprises an upper arm provided on the one end and in flexible connection to the head-mounted device, a forearm provided on the other end and in rotation connection to the computer main body; the extendable arm also comprises an adjustment structure provided between the upper arm and forearm for expansion control.

The computer main body is communicatively connected to at least one set of camera units and indicator lights; the camera units are embedded on at least two opposite sides of the opaque display modules of the computer main body; the indicator lights are provided for pointing in the same direction of the captured viewpoints of at least one set of camera units; the camera units are provided to transmit the captured viewpoint position data to the computer main body; and the computer main body is provided for processing the received viewpoints position data, and the equivalent video generated after processing is projected on the realistic screen of the opaque display module.

Further, the head-mounted device comprises a device main body and a connecting arm connected to at least one end of the device main body; the device main body is a flexible clamp structure with the arc shape; the connecting arm is in fixed connection to one end of the device main body in an extension direction along one end of the device main body.

Further, the connecting arm comprises arc arms and contacting stop pieces are provided on the arc arms; the arc arms are at least two in number and symmetrically distributed at both ends of the device main body; the arc arms are provided with waist-shaped holes; the contacting stop pieces are slidingly provided inside the waist-shaped holes; the waist-shaped holes are perpendicular to the device main body in a different plane; the contacting stop pieces are provided inside the arc arms and are in threaded connection to locking bolts on the outside of the arc arms. When the locking bolts are screwed to tighten, the locking bolts and the contacting stop pieces are joint together with each other while clamping the arc arms located between them tightly, thus fixing the contacting stop pieces, the locking bolts and the arc arms to each other and locking the position of the contacting stop pieces in the waist-shaped holes. Therefore, the wearer's head can be positioned at multiple points by at least two contacting stop pieces in conjunction with the device main body, achieving the effect of stable wearing of the head-mounted device.

Further, the inner side of the connecting arm is connected to buckle plates, and the buckle plates are provided with two parallel and through-going perforations; the inner side of the perforations are provided with at least one strap with an elastic effect to be passed through. On the premise of stable wearing of the head-mounted device, it is further fixed by means of elastic straps to achieve the effect of not falling off easily after wearing.

Further, the connecting arm provided on the at least one end of the device main body is further provided with a device slot; the inner side of the device slot is provided to mount a battery and control device connected to the opaque display module on the computer main body; the outer side of the connecting arm is provided with a touch keypad; the touch keypad is connected to the battery and control device of the computer main body for controlling the computer main body by means of touch.

Further, the upper arm of the extendable arm is in flexible connection to the connecting arm by an elbow joint; the elbow joint is rotationally provided on the connecting arm, and the connecting arm is further connected with adjusting screws contacting with the rotation axis of the elbow joint. The degree of the contact tightness between the connecting arm and the elbow joint is adjusted by screwing the adjusting screws, which in turn adjusts the force required to drive the rotational movement of the elbow joint and fixes the orientation of the rotation movement of the elbow joint.

Further, the forearm of the extendable arm is in rotation connection to the opaque display module of the computer main body by a rotation pin; the opaque display module is provided on the one end of the forearm and to rotate around the rotation pin to adjust the angle and orientation of the opaque display module.

Further, the adjustment structure of the extendable arm comprises a cantilever, an extendable plate and an outer sleeve; the cantilever and the extendable plate are provided parallelly to each other in an extendable groove inside the outer sleeve; the extendable plate is slidingly provided in the outer sleeve and connected to the forearm of the extendable arm; the cantilever is fixed insides the outer sleeve and the outer sleeve is connected to the upper arm of the extendable arm; the cantilever is fixedly provided with a spring plate on the one side towards the extendable plate, and the extendable plate is provided with a gear groove on the side of the extendable plate towards the cantilever; the spring plate is contacted with the gear groove and the end of the extendable plate is provided with a stop block to prevent slipping out of the extendable groove.

During the expansion adjustment of the adjustment structure, the extendable plate is driven by the forearm to slide inside the outer sleeve, so that the spring plate could be contacted inside the gear groove with different positions. Limiting the relative position of the extendable plate and the cantilever can achieve the purpose of adjusting the extendable arm length.

Further, the adjustment structure of the extendable arm comprises an extendable rod, a friction plate, a spring and an outer sleeve; the one end of the extendable rod is connected to the forearm of the extendable arm, and the other end of the extendable rod is provided in the extendable groove of the outer sleeve; the extendable rod is connected to the friction plate by the blot; the friction plate is slidingly provided along the inner wall of the extendable groove of the outer sleeve, and the diameter of the friction plate is larger than the groove diameter of the extendable groove; the extendable rod is further connected to the spring by bolt, and the other end of the spring is fixed to the outer sleeve; the outer sleeve is connected to the upper arm of the extendable arm.

During the expansion adjustment of the adjustment structure, the extendable rod is driven by the forearm to slide inside the outer sleeve. The frictional resistance between the friction plate connected to the extendable rod and the inner wall of the extendable groove of the outer sleeve is used to limit the position of the extendable rod after expansion. The spring is provided for preventing slippage and cushioning the force during expansion.

Further, the camera units comprise a first camera device embedded in the opaque display module of the computer main body towards the same direction as the wearer's viewpoint position, and a second camera device embedded in the opaque display module of the computer main body towards the wearer's faces.

The first camera device is provided for capturing viewpoint position data in the area where the wearer's viewpoint position is oriented and transmitting the data to the computer main body; the data is processed by the computer main body to generate the equivalent video to be projected on the realistic screen of the opaque display module for the wearer to view.

The second camera device is provided for photographing facial information of the wearers, to obtain facial data of the wearers and to transmit it to the computer main body (5); the data is processed by the computer main body to generate the facial video to be projected on the realistic screen of the opaque display module or for remote video communication.

Further, the indicator is a laser indicator and the laser indicators are embedded in the opaque display module of the computer main body and provided on the same plane as the first camera device; the computer main body is also provided to send position adjustment data to the indicators according to the received viewpoint position data, and the laser indicators adjust the laser indication positions according to the adjustment data sent by the computer main body, to guarantee that the indication position points to the viewpoint position of the first camera device.

Further, the head-mounted device is further provided with laser lights, and the laser lights are provided at one end of the device main body; the laser lights are provided in the extension direction of the end of the device main body when the head-mounted device is worn; the laser lights are provided in the direction parallel to the direction of the wearer's view, and the fixed laser indication direction of the laser lights can be regarded as a reference for the adjustment of the laser indication position of the laser indicators.

Further, the adjusted laser indication position of the laser indicators is provided at the center position of the viewpoint position data collected by the first camera device, which means that the generated facial video after processing the viewpoint position data can be projected on a realistic screen at the right center position with good laser indication effect.

Further, the laser indicator further comprises a power module, and the power module is provided to adjust the laser indication position of the laser indicators after receiving the adjustment data from the computer main body.

Compared to the prior art, the invention has the following advantages and beneficial effects: the invention connects the computer to the head-mounted device by adding an extendable arm, and the control of the expansion adjustment of the extendable arm is achieved by means of at least one adjustment structure. The length of the straight arm of the extendable arm can be adjusted through rotation and expansion, to adjust the position and orientation of the opaque display module of the computer main body; the computer is communicatively connected to at least one set of camera units and indicator lights for collecting the viewpoints position data and the equivalent video generated after processing is projected to the realistic screen of the opaque display module. The invention realizes the convenient wearing as well as high stability, and the multiple views of the computer for enhancing the reality display effect through the superposition of multiple cameras and laser lights, to enhance the reality display effect, enrich the display content, and achieve a particular virtual perspective effect.

4. BRIEF DESCRIPTION OF THE DRAWINGS

In the figures, 1. the head-mounted device; 2. the connecting arm; 21. the arc arms; 22. the contacting stop pieces; 23. the waist-shaped holes; 24. the locking bolts; 25. the device slot; 26. the buckle plates; 27. the perforations; 28. the touch keypad; 3. the elbow joint; 31. the adjusting screws; 4. the extendable arm; 41. the upper arm; 42. the forearm; 43. the rotation pin; 44. the cantilever; 45. the extendable plate; 46. the gear groove; 47. the spring plate; 48. the outer sleeve; 49. the extendable groove; 410. the extendable rod; 411. the friction plate; 412. the bolt; 413. the spring; 5. the computer main body; 51. the laser indicators; 52. the first camera device; 53. the second camera device; 54. the opaque display modules; 6. the laser lights.

5. DETAILED DESCRIPTION OF THE PREFERRED EMBODIMENTS

To better understand the invention, the further description of the invention is given below in combination with the specific embodiments. It is to be understood that the embodiments and the accompanying drawings are intended only for an exemplary description of the invention and do not constitute any limitation on the scope of protection of the invention. All reasonable transformations and combinations included within the inventive purpose of the invention fall within the scope of protection of the invention.

A further description of the invention is given below in combination with the attached drawings and please refer to FIG. 1 to FIG. 10 which are schematic views showing the structure of an AI headset computer with a freely adjustable cantilever provided by embodiments of the invention.

The embodiment of the invention provided an AI headset computer with a freely adjustable cantilever, comprising a head-mounted device and a computer main body 5 connected to the head-mounted device. Wherein the head-mounted device comprises a device main body 1 and a connecting arm 2 connected to at least one end of the device main body 1; the device main body 1 is a flexible clamp structure with the arc shape; the connecting arm 2 is in fixed connection to one end of the device main body 1 in an extension direction along one end of the device main body 1.

Figure 1:
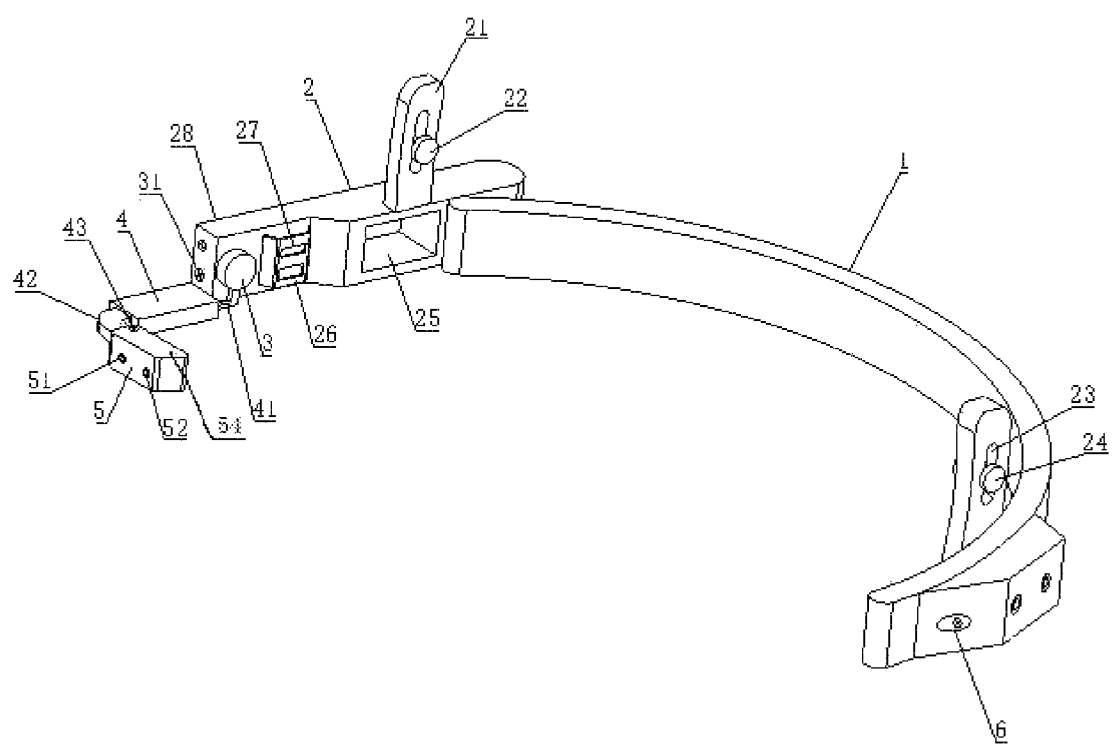
FIG. 1 is a schematic view showing the structure of an AI headset computer with a freely adjustable cantilever.

As shown in the FIG. 1, the head-mounted device comprises a device main body with the semi-circular shape and a connecting arm 2 fixed on the one end of the device main body 1. In some embodiments, the connecting arm 2 comprises arc arms 21 and contacting stop pieces 22 provided on the arc arms 21.

Wherein, the arc arms 21 are at least two in number and symmetrically distributed at both ends of the device main body 1. As shown in the FIG. 1, the number of the arc arms is two and the arc arms 21 are symmetrically distributed at upper sides of both ends of the device main body 1. The arc arms 21 are provided with waist-shaped holes 23 and the waist-shaped holes 23 are perpendicular to the device main body 1 in a different plane. As shown in the FIG. 1, the waist-shaped holes 23 are perpendicular to the device main body 1 in a different plane. When the device main body 1 is worn horizontally, it is convenient to up-and-down slide of the contacting stop pieces 22 along the longitudinal distribution of the waist-shaped holes 23, to adjust the position where it needs to be contacted on the wearer's head.

The contacting stop pieces 22 are provided inside the arc arms 21 and are in threaded connection to locking bolts 24 on the outside of the arc arms 21. When the locking bolts 24 are screwed to tighten, the locking bolts 24 and the contacting stop pieces 22 are joint together with each other while clamping the arc arms 21 located between them tightly, thus fixing the contacting stop pieces 22, the locking bolts 24 and the arc arms 21 to each other and locking the position of the contacting stop pieces 22 in the waist-shaped holes 23. Therefore, the wearer's head can be positioned at multiple points by at least two contacting stop pieces 22 in conjunction with the device main body 1, achieving the effect of stable wearing of the head-mounted device.

In some embodiments, as shown in the FIG. 1, the inner side of the connecting arm 2 is connected to buckle plates 26, and the buckle plates 26 are provided with two parallel and through-going perforations 27; the inner side of the perforations 27 are provided with at least one strap with an elastic effect to be passed through. On the premise of stable wearing of the head-mounted device, it is further fixed by means of elastic straps to achieve the effect of not falling off easily after wearing.

In the embodiment provided by the invention, preferably, the inner side of both end of the device main body 1 are provided with buckle plates 26, and the inner side of the perforations 27 of the buckle pates 26 are provided with one strap with an elastic effect and two ends of strap are passed through the perforations 27. Therefore, a further strap between the two buckle plates 26 that wraps around the wearer's head and serves the same purpose as the device main body 1 is created, ensuring the stability of the head-mounted device when worn with the combination of the limiting position of the contacting stop pieces 22, the strap and the device main body 1.

In some embodiments, as shown in the FIG. 1, the connecting arm 2 provided on the at least one end of the device main body 1 is further provided with a device slot 25; the inner side of the device slot 25 is provided to mount a battery and control device connected to the opaque display module on the computer main body 5; the outer side of the connecting arm 2 is provided with a touch keypad 28; the touch keypad 28 is connected to the battery and control device of the computer main body 5 for controlling the computer main body 5 by means of touch.

Figure 2:
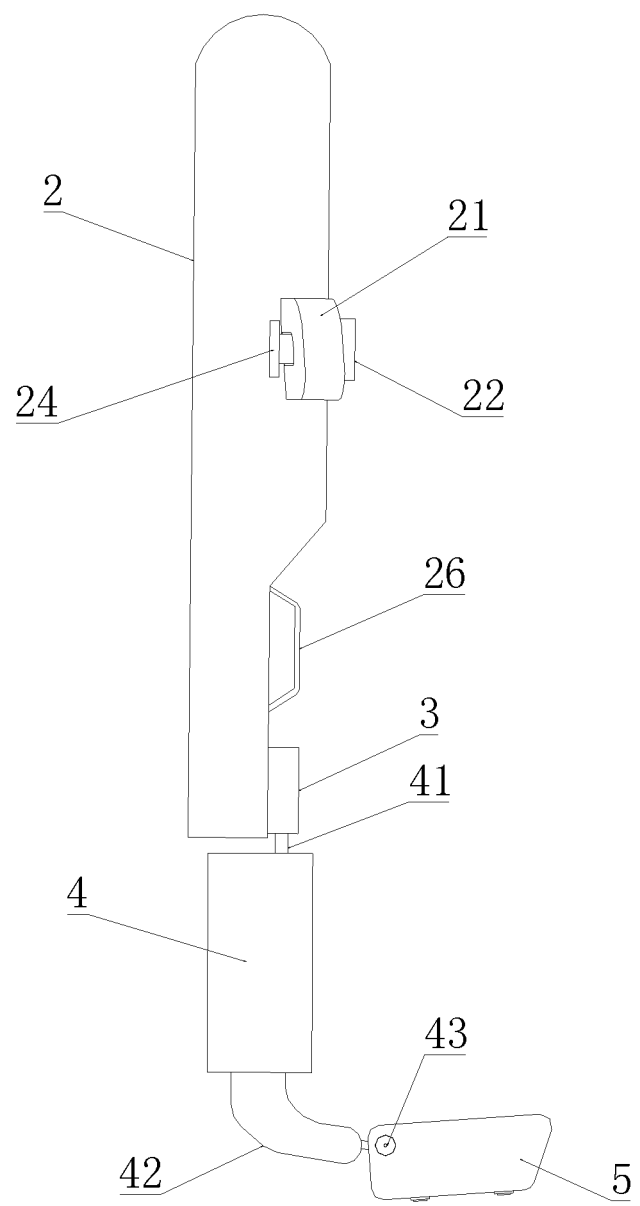
FIG. 2 is a schematic view showing the structure of the extendable arm of an AI headset computer with a freely adjustable cantilever.

As shown in the FIG. 1 and FIG. 2, the computer main body 5 is connected to the head-mounted device by an extendable arm 4; the extendable arm 4 comprises an upper arm 41 provided on the one end and in flexible connection to the head-mounted device, a forearm 42 provided on the other end and in rotation connection to the computer main body 5; the extendable arm 4 also comprises an adjustment structure provided between the upper arm 41 and forearm 42 for expansion control;

In some embodiments, as shown in the FIG. 1 and FIG. 2, the upper arm 41 of the extendable arm 4 is in flexible connection to the connecting arm 2 by an elbow joint 3; the elbow joint 3 is rotationally provided on the connecting arm 2, and the connecting arm 2 is further connected with adjusting screws 31 contacting with the rotation axis of the elbow joint 3. The degree of the contact tightness between the connecting arm 2 and the elbow joint 3 is adjusted by screwing the adjusting screws 31, which in turn adjusts the force required to drive the rotational movement of the elbow joint 3 and fixes the orientation of the rotation movement of the elbow joint 3.

In some embodiments, as shown in the FIG. 1 and FIG. 2, the forearm 42 of the extendable arm 4 is in rotation connection to the opaque display module of the computer main body 5 by a rotation pin 43; the opaque display module is provided on the one end of the forearm 42 and to rotate around the rotation pin 43 to adjust the angle and orientation of the opaque display module.

Figure 3:
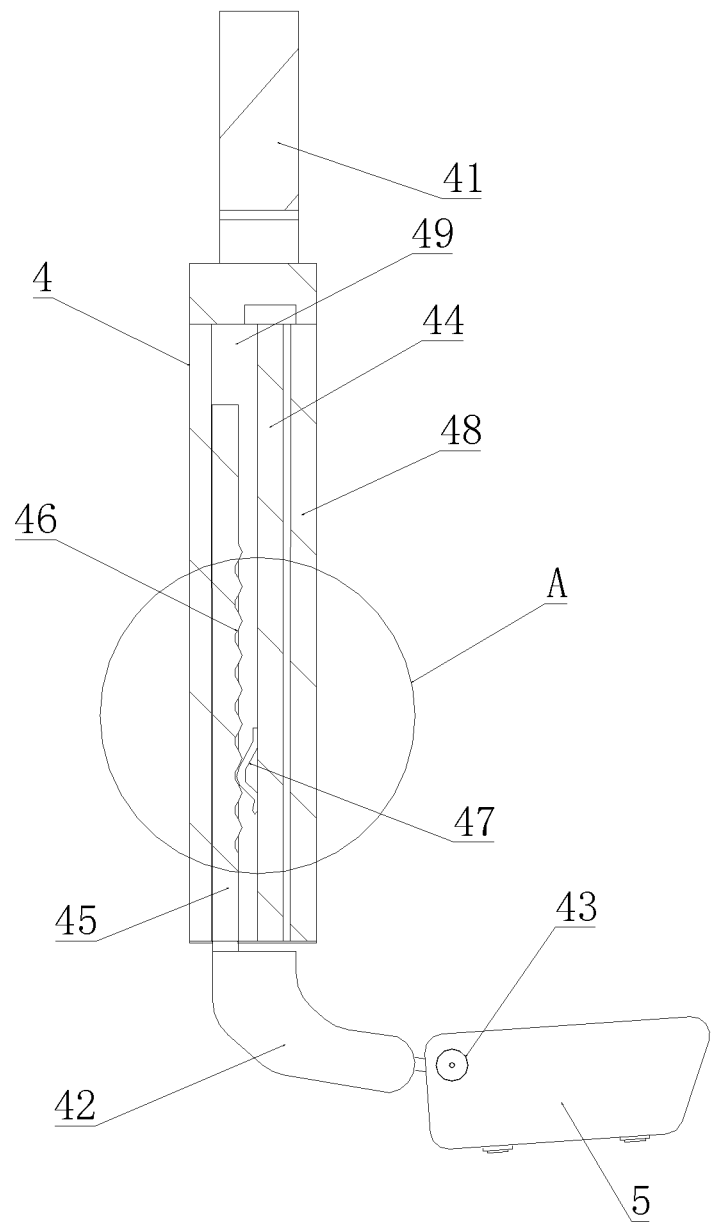
FIG. 3 is a schematic view showing the structure of the adjustment structure I of the extendable arm of an AI headset computer with a freely adjustable cantilever.
Figure 4:
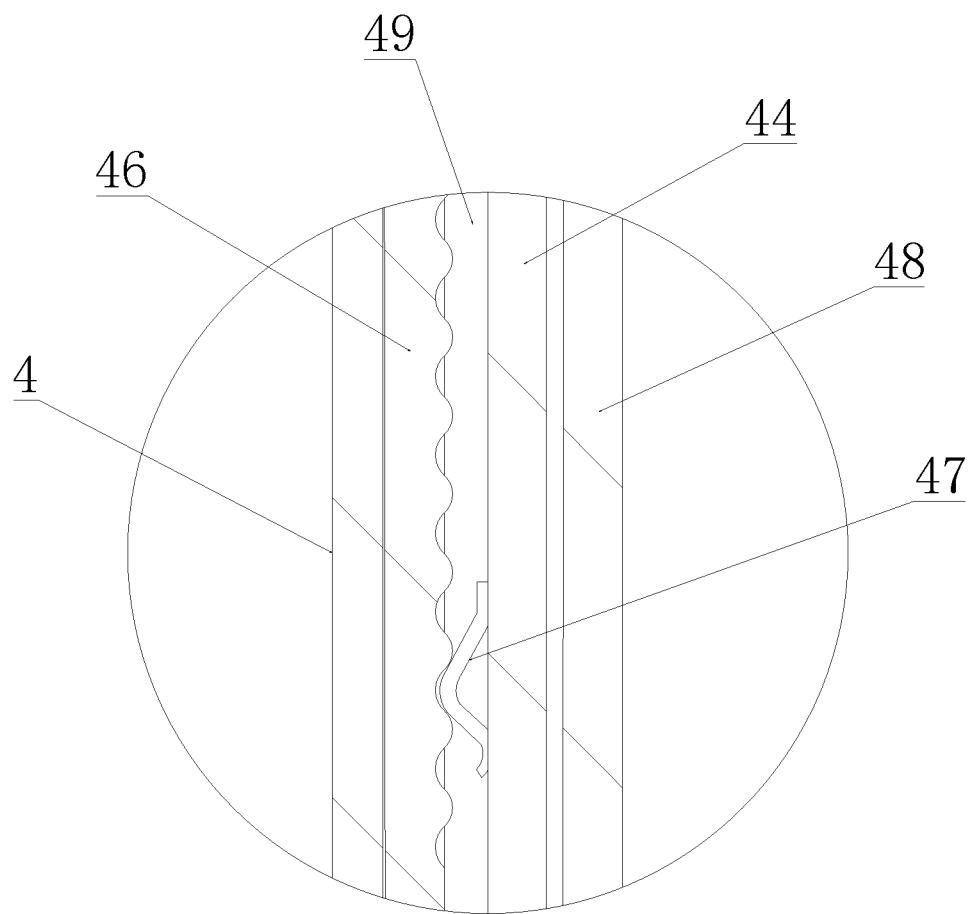
FIG. 4 is an enlarged view for A in FIG. 3.
Figure 5:
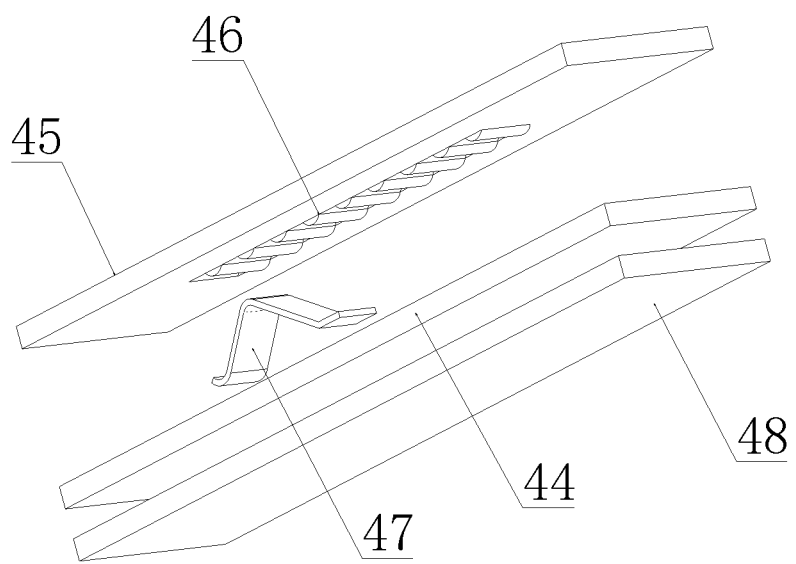
FIG. 5 is an exploded view showing the structure of the adjustment structure I of the extendable arm of an AI headset computer with a freely adjustable cantilever in FIG. 3.

In some embodiments, as shown in the FIG. 3, FIG. 4 and FIG. 5, the adjustment structure of the extendable arm 4 comprises a cantilever 44, an extendable plate 45 and an outer sleeve 48; the cantilever 44 and the extendable plate 45 are provided parallelly to each other in an extendable groove 49 inside the outer sleeve 48; the extendable plate 45 is slidingly provided in the outer sleeve 48 and connected to the forearm 42 of the extendable arm 4; the cantilever 44 is fixed insides the outer sleeve 48 and the outer sleeve 48 is connected to the upper arm 41 of the extendable arm 4; the cantilever 44 is fixedly provided with a spring plate 47 on the one side towards the extendable plate 45, and the extendable plate 45 is provided with a gear groove 46 on the side of the extendable plate 45 towards the cantilever 44; the spring plate 47 is contacted with the gear groove 46 and the end of the extendable plate 45 is provided with a stop block to prevent slipping out of the extendable groove 49.

During the expansion adjustment of the adjustment structure, the extendable plate 45 is driven by the forearm 42 to slide inside the outer sleeve 48, so that the spring plate 47 could be contacted inside the gear groove 46 with different positions. Limiting the relative position of the extendable plate 45 and the cantilever can achieve the purpose of adjusting the extendable arm 4 length.

Figure 6:
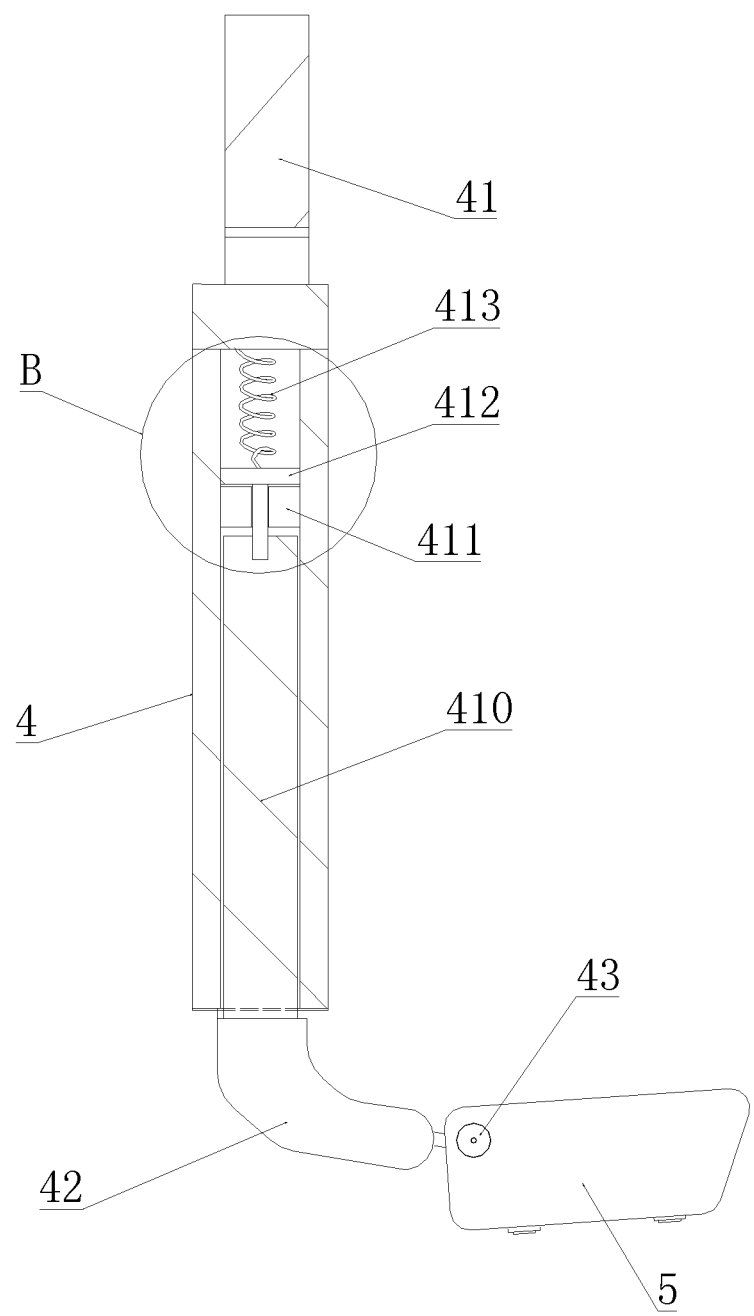
FIG. 6 is a schematic view showing the structure of the adjustment structure II of the extendable arm of an AI headset computer with a freely adjustable cantilever.
Figure 7:
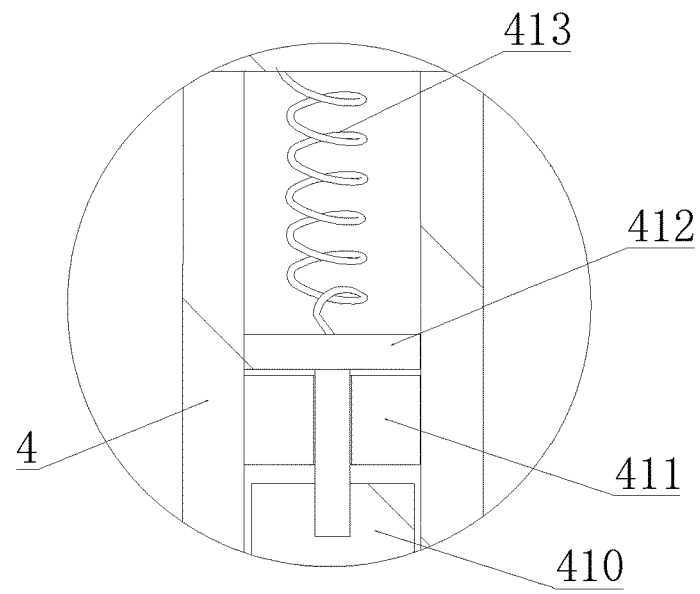
FIG. 7 is an enlarged view for B in FIG. 6.

In some embodiments, as shown in the FIG. 6 and FIG. 7, the adjustment structure of the extendable arm 4 comprises an extendable rod 410, a friction plate 411, a spring 413 and an outer sleeve 48; the one end of the extendable rod 410 is connected to the forearm 42 of the extendable arm 4, and the other end of the extendable rod 410 is provided in the extendable groove 49 of the outer sleeve 48; the extendable rod 410 is connected to the friction plate 411 by the blot 412; the friction plate 411 is slidingly provided along the inner wall of the extendable groove 49 of the outer sleeve 48, and the diameter of the friction plate 411 is larger than the groove diameter of the extendable groove 49; the extendable rod 410 is further connected to the spring 413 by bolt 412, and the other end of the spring 413 is fixed to the outer sleeve 48; the outer sleeve 48 is connected to the upper arm 41 of the extendable arm 4.

During the expansion adjustment of the adjustment structure, the extendable rod 410 is driven by the forearm 42 to slide inside the outer sleeve 48. The frictional resistance between the friction plate 411 connected to the extendable rod 410 and the inner wall of the extendable groove 49 of the outer sleeve 48 is used to limit the position of the extendable rod 410 after expansion. The spring 413 is provided for preventing slippage and cushioning the force during expansion.

As shown in the FIG. 1, FIG. 2, FIG. 8 to FIG. 10, the computer main body 5 is communicatively connected to at least one set of camera units and indicator lights; the camera units are embedded on at least two opposite sides of the opaque display modules of the computer main body 5; the indicator lights are provided for pointing in the same direction of the captured viewpoints of at least one set of camera units; the camera units are provided to transmit the captured viewpoint position data to the computer main body 5; and the computer main body 5 is provided for processing the received viewpoints position data, and the equivalent video generated after processing is projected on the realistic screen of the opaque display module.

In some embodiments, the camera units comprise a first camera device 52 embedded in the opaque display module of the computer main body 5 towards the same direction as the wearer's viewpoint position, and a second camera device 53 embedded in the opaque display module of the computer main body 5 towards the wearer's faces.

In the embodiment provided by the invention, preferably, the first camera device 52 and the second camera device 53 can be selected from an arbitrary of the group consisting of a plus depth of field camera, a 3D TOF depth camera, a panoramic camera and so on.

In the embodiment provided by the invention, the first camera device 52 is provided for capturing viewpoint position data in the area where the wearer's viewpoint position is oriented and transmitting the data to the computer main body 5; the data is processed by the computer main body 5 to generate the equivalent video to be projected on the realistic screen of the opaque display module for the wearer to view.

Figure 8:
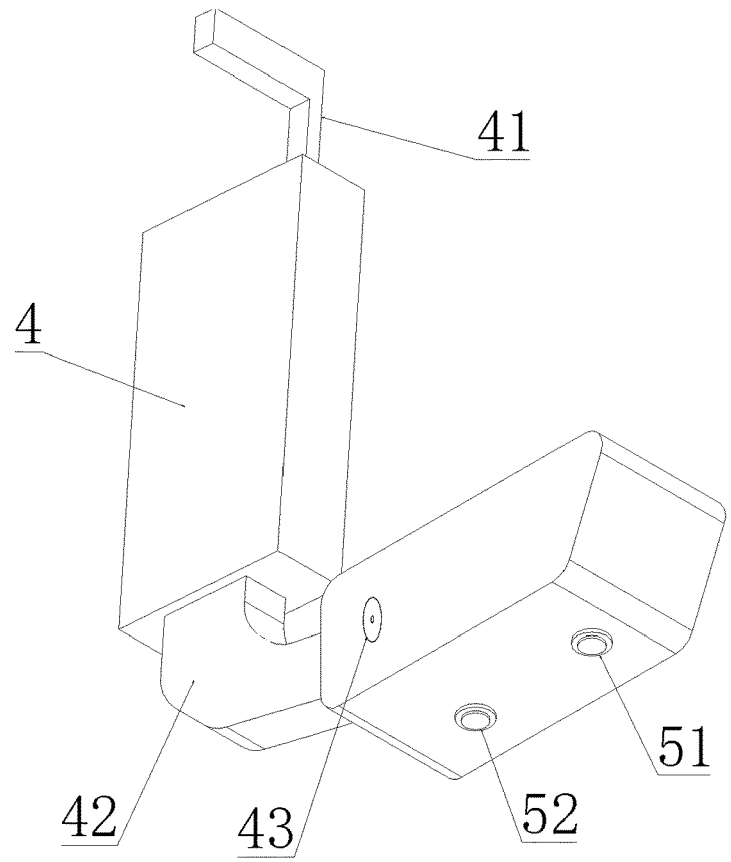
FIG. 8 is a schematic view showing the structure of the computer main body of an AI headset computer with a freely adjustable cantilever.
Figure 9:
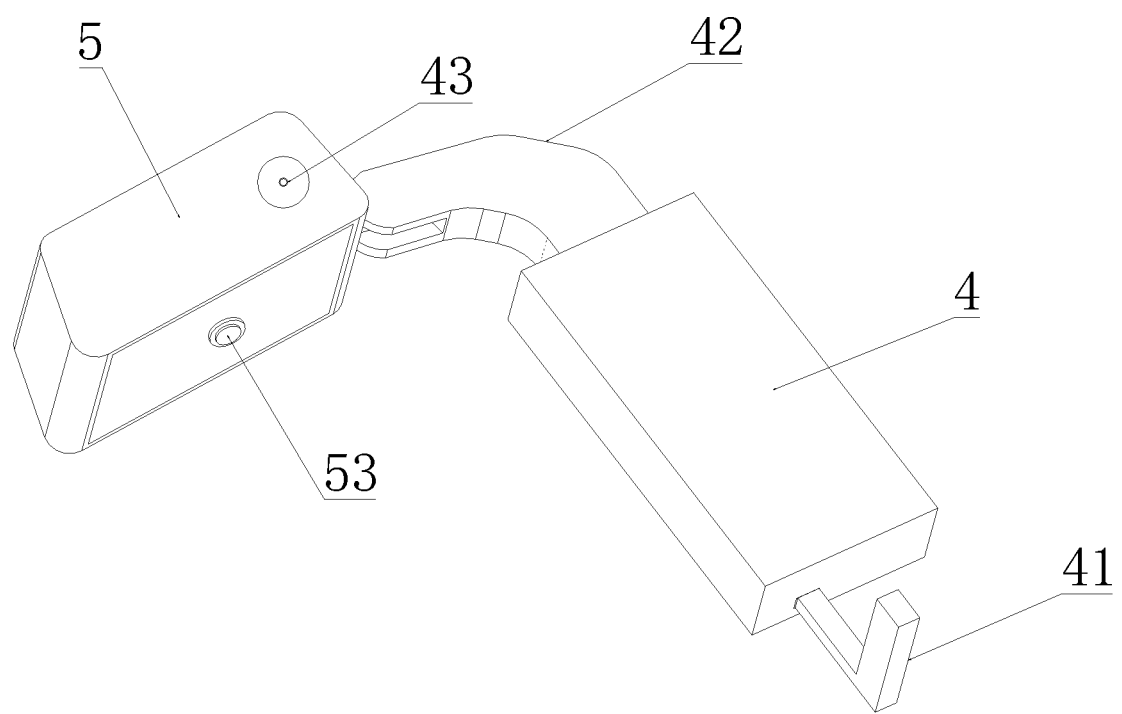
FIG. 9 is a schematic view showing the structure of the second camera device of an AI headset computer with a freely adjustable cantilever.
Figure 10:
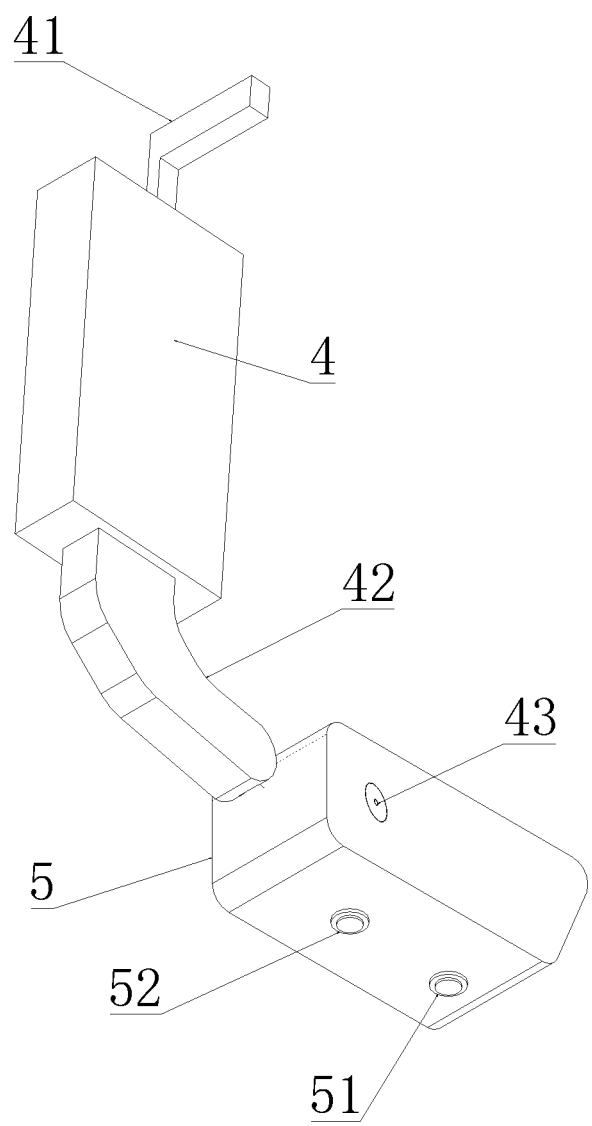
FIG. 10 is a schematic view showing the structure of the extendable arm connecting the computer main body of an AI headset computer with a freely adjustable cantilever.

In the embodiment provided by the invention, the second camera device 53 is provided for photographing facial information of the wearers, to obtain facial data of the wearers and to transmit it to the computer main body 5; the data is processed by the computer main body 5 to generate the facial video to be projected on the realistic screen of the opaque display module or for remote video communication In some embodiments, as shown in the FIG. 8 to FIG. 10, the indicator is a laser indicator 51 and the laser indicators 51 are embedded in the opaque display module of the computer main body 5 and provided on the same plane as the first camera device 52; the computer main body 5 is also provided to send position adjustment data to the indicators according to the received viewpoint position data, and the laser indicators 51 adjust the laser indication positions according to the adjustment data sent by the computer main body 5, to guarantee that the indication position points to the viewpoint position of the first camera device 52.

Wherein, the laser indicator 51 further comprises a power module, and the power module is provided to adjust the laser indication position of the laser indicators 51 after receiving the adjustment data from the computer main body 5.

In some embodiments, the adjusted laser indication position of the laser indicators 51 is provided at the center position of the viewpoint position data collected by the first camera device 52, which means that the generated facial video after processing the viewpoint position data can be projected on a realistic screen at the right center position with good laser indication effect.

In some embodiments, as shown in the FIG. 1, the head-mounted device is further provided with laser lights 6, and the laser lights 6 are provided at one end of the device main body 1; the laser lights 6 are provided in the extension direction of the end of the device main body 1 when the head-mounted device is worn; the laser lights 6 are provided in the direction parallel to the direction of the wearer's view, and the fixed laser indication direction of the laser lights 6 can be regarded as a reference for the adjustment of the laser indication position of the laser indicators.

The invention connects the computer main body 5 to the head-mounted device by adding an extendable arm 4, and the control of the expansion adjustment of the extendable arm 4 is achieved by means of at least one adjustment structure. The length of the straight arm of the extendable arm 4 can be adjusted through rotation and expansion, to adjust the position and orientation of the opaque display module of the computer main body 5; the computer main body 5 is communicatively connected to at least one set of camera units and indicator lights for collecting the viewpoints position data and the equivalent video generated after processing is projected to the realistic screen of the opaque display module. The invention realizes the convenient wearing as well as high stability, and the multiple views of the computer main body 5 for enhancing the reality display effect through the superposition of multiple cameras and laser lights, to enhance the reality display effect, enrich the display content, and achieve a particular virtual perspective effect.

In the description of the embodiments of the disclosure, it should be understood that the orientation or positional relationship indicated by the terms 'center', 'longitudinal', 'lateral', 'top', 'bottom', 'inner', 'outer', 'upper', 'lower', 'front', 'back', 'left', 'right', 'vertical', 'horizontal' and so on are based on an orientation or a positional relationship shown in the drawings, and is only for the convenience of describing the disclosure and simplifying the description, instead of implying or indicating that the device or element referred to must have a specific orientation, be constructed and operated in a specific orientation, and therefore cannot be understood as a limitation of the present disclosure. In addition, terms 'first' and 'second' are used merely for the purpose of description and shall not be construed as indicating or implying relative importance or implying a quantity of indicated technical features. Therefore, in the description of the invention, 'a plurality' means two or more unless explicitly defined otherwise. A feature limited by "first" or "second" may explicitly or implicitly includes one or more of the features.

What should be finally explained is that although the embodiments of the invention have been present and described above, the above embodiments are exemplary and not the limitations, and without deviating from the spirit and scope of the technical scheme in the invention, other changes, modifications, replacements and variations on the technical scheme in the invention can be made by common technicians in the field. The disclosed embodiments are therefore to be considered in all respects as illustrative and not restrictive, the scope of the invention being defined by the appended claims, and not limited to the foregoing description or embodiments.

The invention and the embodiments thereof are described hereinabove, and this description is not restrictive. What is shown above is only the principles and the preferred embodiments of the invention, and the actual structure is not limited thereto. Although the description is described in terms of embodiments, the embodiments are not intended to be construed as a single. The technical solutions in the embodiments may also be combined as appropriate to form other embodiments that can be understood by those skilled in the art. In summary, any equivalent structures or equivalent process transformations made by using the specifications and the attaching drawings of the invention, or direct or indirect applications to other related technical fields, shall all fall within the protection scope of the invention.

The invention claimed is:

1. An AI headset computer with a freely adjustable cantilever, wherein comprises a head-mounted device and a computer main body (5) connected to the head-mounted device;
the computer main body (5) is connected to the head-mounted device by an extendable arm (4); the extendable arm (4) comprises an upper arm (41) provided on the one end and in flexible connection to the head-mounted device, a forearm (42) provided on the other end and in rotation connection to the computer main body (5); the extendable arm (4) also comprises an adjustment structure provided between the upper arm (41) and forearm (42) for expansion control;
the computer main body (5) is communicatively connected to at least one set of camera units and indicator lights; the camera units are embedded on at least two opposite sides of opaque display modules of the computer main body (5); the indicator lights are provided for pointing in the same direction of the captured viewpoints of at least one set of camera units; the camera units are provided to transmit captured viewpoints position data to the computer main body (5); and the computer main body (5) is provided for processing the received viewpoints position data, and an equivalent video generated after processing is projected on a realistic screen of the opaque display module; the head-mounted device comprises a device main body (1) and a connecting arm (2) connected to at least one end of the device main body (1); the device main body (1) is a flexible clamp structure with the arc shape; the connecting arm (2) is in fixed connection to one end of the device main body (1) in an extension direction along one end of the device main body (1);
wherein the connecting arm (2) comprises arc arms (21) and contacting stop pieces (22) are provided on the arc arms (21); the arc arms (21) are at least two in number and symmetrically distributed at both ends of the device main body (1); the arc arms (21) are provided with waist-shaped holes (23); the contacting stop pieces (22) are slidingly provided inside the waist-shaped holes (23); the waist-shaped holes (23) are perpendicular to the device main body (1) in a different plane; the contacting stop pieces (22) are provided inside the arc arms (21) and are in threaded connection to locking bolts (24) on the outside of the arc arms (21).

2. The AI headset computer of claim 1, wherein the inner side of the connecting arm (2) is connected to buckle plates (26), and the buckle plates are provided with two parallel and through-going perforations (27); the inner side of the perforations (27) are provided with at least one strap with an elastic effect to be passed through.

3. The AI headset computer of claim 2, wherein the connecting arm (2) provided on the at least one end of the device main body (1) is further provided with a device slot (25); the inner side of the device slot (25) is provided to mount a battery and control device connected to the opaque display module on the computer main body (5); the outer side of the connecting arm (2) is provided with a touch keypad (28); the touch keypad (28) is connected to the battery and control device of the computer main body (5) for controlling the computer main body (5) by means of touch.

4. The AI headset computer of claim 1, wherein the upper arm (41) of the extendable arm (4) is in flexible connection to the connecting arm (2) by an elbow joint (3); the elbow joint (3) is rotationally provided on the connecting arm (2), and the connecting arm (2) is further connected with adjusting screws (31) contacting with the rotation axis of the elbow joint (3).

5. The AI headset computer of claim 4, wherein the forearm (42) of the extendable arm (4) is in rotation connection to the opaque display module of the computer main body (5) by a rotation pin (43); the opaque display module is provided on the one end of the forearm (42) and to rotate around the rotation pin (43) to adjust the angle and orientation of the opaque display module.

6. The AI headset computer of claim 1, wherein the adjustment structure of the extendable arm (4) comprises a cantilever (44), an extendable plate (45) and an outer sleeve (48); the cantilever (44) and the extendable plate (45) are provided parallelly to each other in an extendable groove (49) inside the outer sleeve (48); the extendable plate (45) is slidingly provided in the outer sleeve (48) and connected to the forearm (42) of the extendable arm (4); the cantilever (44) is fixed insides the outer sleeve (48) and the outer sleeve (48) is connected to the upper arm (41) of the extendable arm (4); the cantilever (44) is fixedly provided with a spring plate (47) on the one side towards the extendable plate (45), and the extendable plate (45) is provided with a gear groove (46) on the side of the extendable plate (45) towards the cantilever (44); the spring plate (47) is contacted with the gear groove (46) and the end of the extendable plate (45) is provided with a stop block to prevent slipping out of the extendable groove (49).

7. The AI headset computer of claim 1, wherein the camera units comprise a first camera device (52) embedded in the opaque display module of the computer main body (5) towards the same direction as the wearer's viewpoint position, and a second camera device (53) embedded in the opaque display module of the computer main body (5) towards the wearer's face;

- the first camera device (52) is provided for capturing viewpoint position data in the area where the wearer's viewpoint position is oriented and transmitting the data to the computer main body (5); the data is processed by the computer main body (5) to generate the equivalent video to be projected on the realistic screen of the opaque display module for the wearer to view;
- the second camera device (53) is provided for photographing facial information of the wearers, to obtain facial data of the wearers and to transmit it to the computer main body (5); the data is processed by the computer main body (5) to generate the facial video to be projected on the realistic screen of the opaque display module or for remote video communication.

* * * * *